United States Patent [19]
Forsyth et al.

[11] 3,933,258
[45] Jan. 20, 1976

[54] VEHICULAR TRANSPORTATION SYSTEM

[76] Inventors: Robert W. Forsyth; John P. Forsyth, both of 1517 N. 3rd Ave., Upland, Calif. 91786

[22] Filed: Jan. 2, 1974

[21] Appl. No.: 430,186

[52] U.S. Cl.................. 214/85; 62/237; 105/368 R; 105/368 T; 296/1 A
[51] Int. Cl.² .......................................... B60P 1/00
[58] Field of Search .......... 296/1 A; 214/85, 83.24, 214/83.26; 98/2.02; 62/237; 105/366 C, 366 B, 368 R, 368 T

[56] References Cited
UNITED STATES PATENTS

| | | | |
|---|---|---|---|
| 2,432,228 | 12/1947 | De Lano | 296/1 A |
| 2,620,636 | 12/1952 | Stanton | 62/237 |
| 2,808,159 | 10/1957 | Simo' | 214/83.34 |
| 3,159,111 | 12/1964 | Gutridge et al. | 105/366 B |
| 3,285,194 | 11/1966 | Clejan | 105/368 R |
| 3,290,058 | 12/1966 | Ellerd | 105/368 R |
| 3,468,369 | 9/1969 | Tetrick et al. | 62/237 |
| 3,511,393 | 5/1970 | Abromavage et al. | 214/85 |
| 3,584,584 | 6/1971 | Milenkovic | 105/368 R |
| 3,739,906 | 6/1973 | Cwycyshyn et al. | 105/368 R |

FOREIGN PATENTS OR APPLICATIONS

| | | | |
|---|---|---|---|
| 1,216,541 | 12/1970 | United Kingdom | 296/1 A |

*Primary Examiner*—Robert J. Spar
*Assistant Examiner*—Gary Auton
*Attorney, Agent, or Firm*—Roger A. Marrs

[57] ABSTRACT

A vehicular transportation system and apparatus therefor is disclosed herein wherein small electrically driven passenger vehicles are carried as a group in a transporter or carrier vehicle. Extendable ramps are carried on the transporter vehicle which may be deployed from either end of the vehicle body for loading and unloading the passenger vehicles along a pair of parallel storage decks. Locking mechanism selectively secures each passenger vehicle in a storage space on the transporter vehicle while a separate conduit system for conducting conditioned air to the stored passenger vehicle is provided between the roof of the passenger vehicle and the transporter vehicle body. The transporter vehicle and electrically driven passenger vehicles are adapted to operate as a combined unit, substantially reducing fuel consumption, air pollution, and congestion, or independently as separate elements, on traffic arteries such as highways or expressways or surface streets.

13 Claims, 15 Drawing Figures

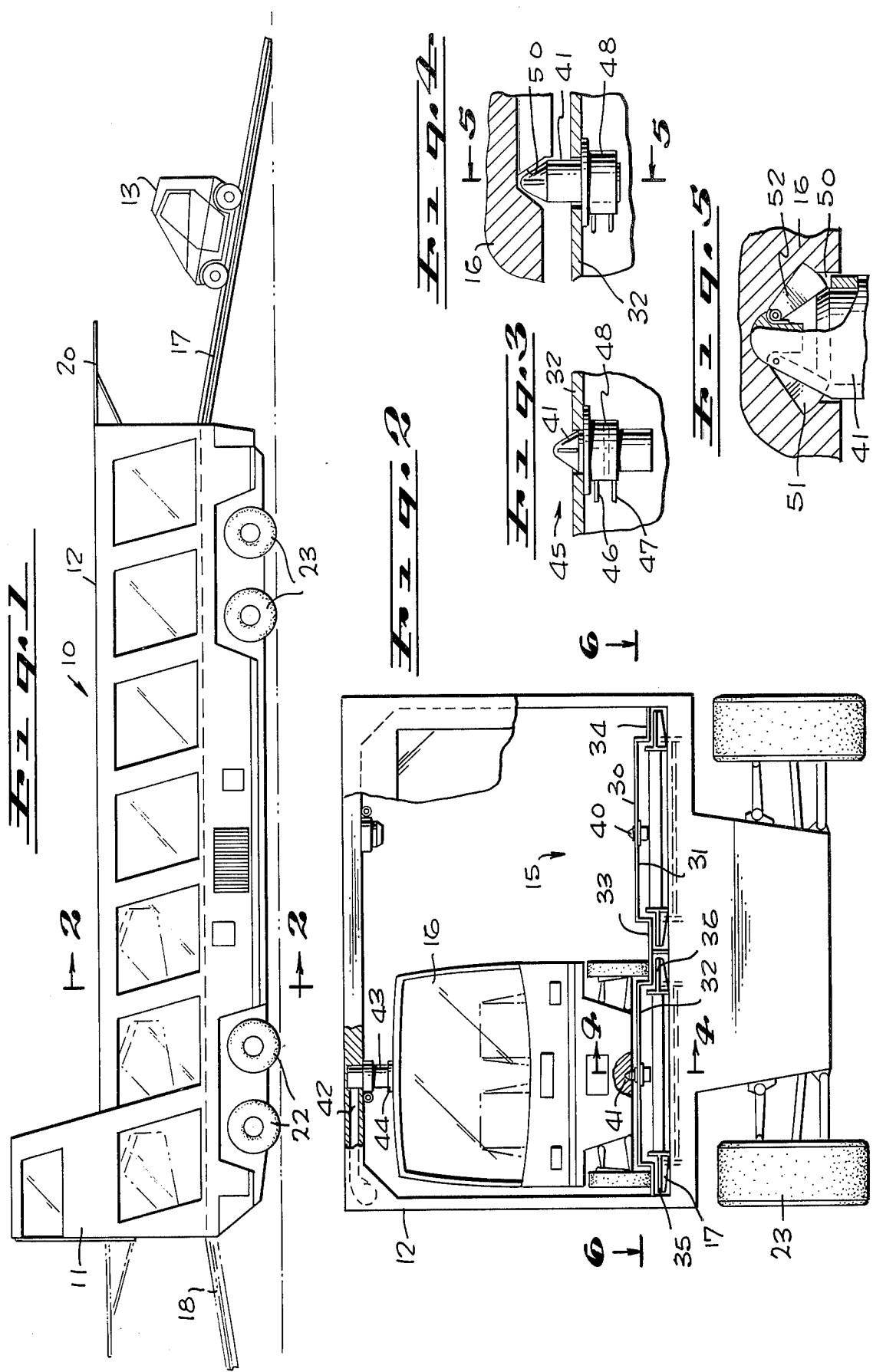

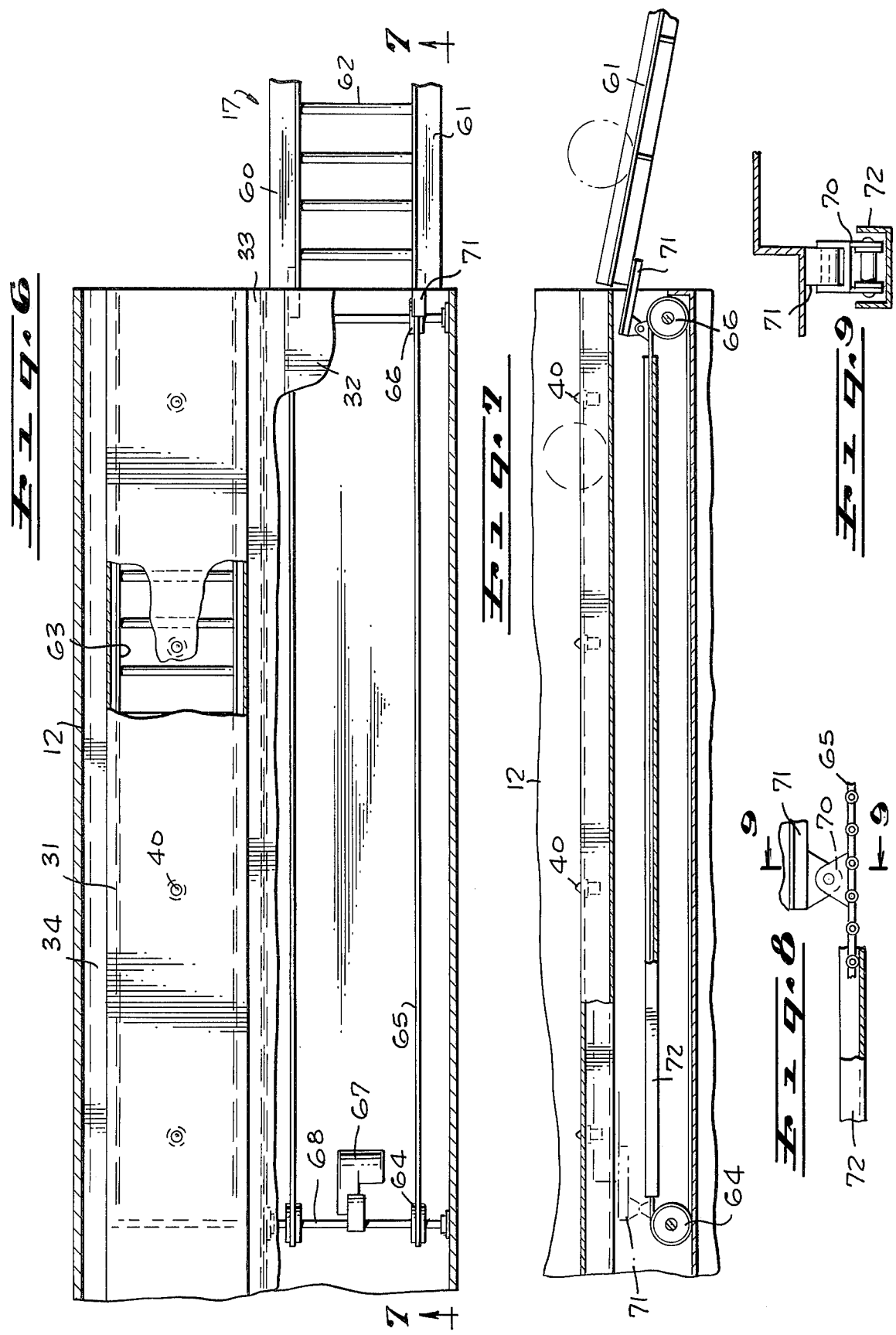

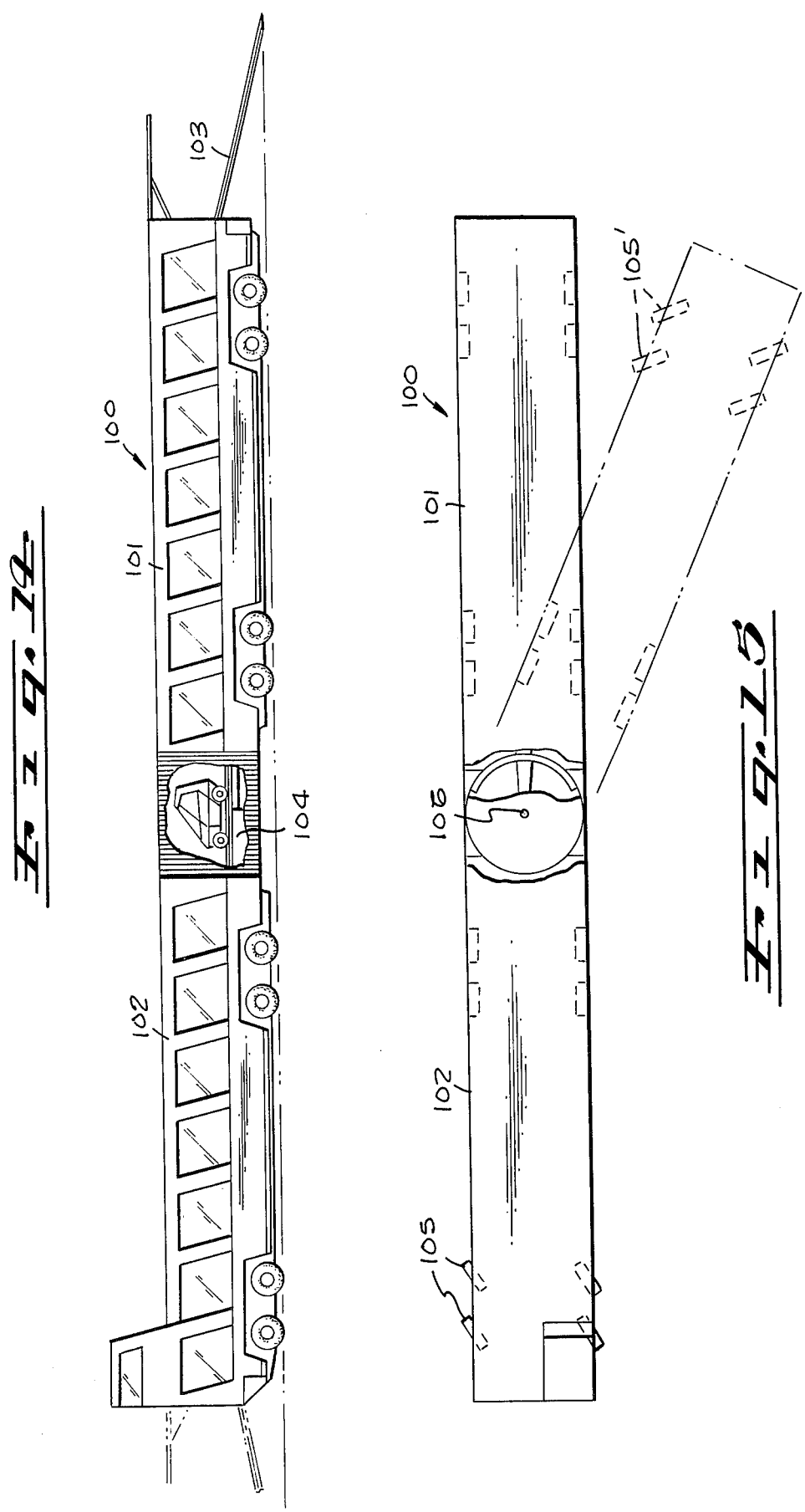

VEHICULAR TRANSPORTATION SYSTEM

RELATED REFERENCES

This application is cross-referenced with applicant's co-pending application for U.S. Letters Patents entitled "Vehicular Transportation System and Apparatus", having Ser. No. 124,808, now U.S. Pat. No. 3,785,514; filed Mar. 16, 1971, and "Transportation Apparatus", having Ser. No. 293,797; filed Oct. 2, 1972.

BACKGROUND OF THE INVENTION

1. Field of the Invention

This invention relates to interurban/intracity transportation systems and, more particularly, to a novel system and apparatus incorporating options for personal-choice travel in which a plurality of individual self-propelled satellite passenger vehicles or cars are selectively combined in a controlled group of vehicles in a transporter vehicle for travelling at a common, uniform speed along a main traffic artery and which are adapted to be diverted or separated from the controlled group at the selection of the driver for each of the individual vehicles or cars at selected stop locations of the transporter vehicle.

2. Description of the Prior Art

Man's improved technology has wrought tremendous advantages in many fields, but relatively little has been done in the field of interurban/intracity transportation systems that has practical value. The prior art in the field may be viewed, for the sake of brevity, as consisting of two broad categories - the existing, currently used conventional transportation systems, private and public; and the various experimental and developmental transportation systems proposed for use in the near future.

The first category is comprised of the internal-combustion engine automobile operating on existing street and road networks and subject to various traffic-flow control devices; public transit bus systems, and trolleys, both those operating on rails and the externally powered, so-called trackless trolleys; public, right-of-way, rail transit systems; and public, right-of-way, suspended or straddle-type monorail transportation systems. The second category is comprised of hybrid-type automobiles, powered by various combinations of heat-engines and electrical power and drive systems, and electrically driven automobiles receiving energy from batteries and fuel cells, both types proposed for operation on existing public street and road networks; dual-mode transportation systems in which small automobiles or bus-like vehicles, incorporating conventional, electrical, or hybrid propulsion systems, may operate in a self-propelled mode on public street and road networks, or may operate on a guideway, track, or monorail system providing external power and automated traffic-flow controls; dual-mode transportation systems in which the vehicles, in the controlled mode, incorporate means for the creation of, and maintenance of air-cushions for vehicle support, suspension, and/or tracking; tube-type transportation systems in which vehicle motion is achieved by gravity, vacuum, or electrical means, air screws, thrust engines, etc.; and public, high-speed, right-of-way transportation systems, comprised of single cars or trains, operating on rails or guideways, supported by wheels, air-cushions, or electromagnetic levitation.

The disadvantages of the prior art, both in existing and proposed transporation systems, are many, however, the most important relate to problems of environmental pollution, lack of provision for personal-choice travel, unsatisfactory economics, and an inherent potential for rapid obsolescence. For example, primary dependence on use of the internal-combustion engine automobile for interurban/intracity travel is a major cause of air pollution, traffic congestion, noise pollution, and considering the number of passengers per car is a wasteful use of fuel in the face of a continuing energy crisis. While a one-for-one conversion to electrically or hybrid powered vehicles may be expected to reduce air pollution, perpetuation of the same private-vehicle use patterns would not alleviate congestion or reduce noise pollution, nor would it reduce constantly increasing requirements for more streets, highways, and parking areas which are expensive to construct, aggravate tax-base problems, and represent poor land utilization. Transit bus and trolley systems also have serious drawbacks, which would not be altogether eliminated by a change to low-pollutant power systems. The most basic problem lies in the fact that the transit bus and trolley systems are not flexible enough to be truly responsive to the needs of the individual passenger — they cannot provide personal-choice travel. Characteristically, too, such systems cannot offer a really pleasant travel environment. Consequently, they cannot compete effectively with the private automobile. This leads to underutilization and unprofitable operations.

Right-of-way, rail transportation systems (contemporary and advanced high-speed types), tube systems, monorails, and tracked, air-cushion systems are potentially vulnerable to underutilization, too, because they also cannot compete with the freedom, privacy and pleasant environment the private automobile offers. However, a far more critical problem is created by the enormous capital outlays needed to acquire rights-of-way and fund the construction of inflexible, single-function, geographically-fixed systems which may quickly be made obsolete by advances in technology, changing use patterns, and changes in population distribution.

Dual-mode transportation systems, based on the use of some type of guideway or track network with external power sources and automated traffic-flow controls, could generally be made flexible enough to provide personal-choice travel, and privacy and a pleasant environment in individual, dual-mode, street/guidway vehicles. Nonetheless, all such systems now in development or proposed also are severely handicapped in practical application by complexity, requirements for expensive rights-of-way, the costs of constructing and operating power distribution systems in the guideway or track to supply external power to the individual vehicles in the guided mode, and the need for some type of mechanical or electromechanical means of assuring that all vehicles using the guideways or tracks are inspected immediately prior to such use to assure their maintenance to uniform mechanical and functional standards to prevent system malfunctions and service interruptions caused by vehicle breakdowns.

In addition, dual-mode transportation systems which employ conventional vehicles having internal combustion engines do not alter the serious air pollution conditions existing in major cities. Nor would they significantly reduce the wasteful use of fuel characteristic of such vehicles. Major modification is required to convert such conventional vehicles for use in automatic control systems wherein programmed processing of a plurality of vehicles is anticipated not only for system flexibility but for safety purposes.

Therefore, a need has long been present for a truly practical interurban/intracity transportation system which successfully combines the advantages of mass rapid transit with the freedon of personal-choice travel and the pleasant environment afforded by the private automobile, which is economical, would enable substantial reductions in the use of fuel for commuter travel and thereby conserve energy, is adapted for programmed control and which permits employment of individual vehicles operable in a controlled grouping on a predetermined course or main traffic artery or separately operable as independent vehicles on conventional roadways and surface streets under their own power.

SUMMARY OF THE INVENTION

Accordingly, the novel transportation system and apparatus of the present invention obviates the problems and difficulties encountered with prior systems and equipment and provides a continuous flow concept in which small satellite passenger vehicles or cars incorporating a power means are used in a self-propelled mode on conventional roadways and surface streets. A transporter vehicle is employed for transporting a plurality of these satellite passenger vehicles or cars on existing main traffic arteries such as highways, freeways, and expressways.

The transporter or carrier vehicle employed in the present invention includes an elongated body having a plurality of openings arranged on either of its sides and includes wheels for rotatably supporting the body on a roadway and self-propelling means for moving the carrier along the roadway on its wheels. The body further includes a parking or storage deck having a pair of elongated, longitudinal parking areas that are in parallel side-by-side relationship so that a plurality of small individual, passenger or satellite vehicles may be parked and stored behind one another in each of the pair of parking areas. Ramp means are extendably carried beneath the storage deck so that the passenger cars may be loaded or unloaded from either end of the carrier body.

A feature of the invention resides in the fact that the satellite or passenger cars are fully equipped with a power means, preferably an electrical traction or induction type motor, drive train, steering mechanism, and braking system. An inherent advantage of the invention lies in the fact that it makes practical for the first time the application of the current state-of-the-art in electric storage battery and electric drive technology to the urban-suburban transportation problem. The major difficulty up to now has been that proposed, state-of-the-art electric passenger automobiles lack the endurance and range (prolonged recharging of the batteries typically being required every 20 to 40 miles of use at moderate speeds) necessary to perform the entire urban-suburban function. This problem or difficulty is resolved in the subject invention because the electrically powered satellite cars would be called upon to propel themselves for only those short distances involved in travel within the central city or local travel in the suburbs. The storage batteries of the satellite cars could also be recharged while the cars were being conveyed on the transporter apparatus. It will also be obvious that, just as the subject invention makes use of current technology in electric storage batteries and electric drives practical, it would also facilitate and enhance future application of new technology in batteries, fuel cells, and other advanced energy storage systems. Means are provided on the carrier and each of the satellite or passenger vehicles for selectively locking the vehicle in a pre-selected parking space in the parking area. Such means may include a moving pin operably mounted on the deck which mates with and engages with a receptacle in the satellite or passenger vehicle. Also, means are provided for interconnecting the roof of the carrier body with the roof of the individual vehicles so as to provide conditioned air (cooled or heated) to the individual vehicles or satellite cars for the comfort of their passengers. Thereby, the present invention envisions the carrying of small satellite or passenger vehicles including the occupants thereof on the carrier vehicle.

Economic advantage of this invention lies in the fact that, unlike the typical mass transit system bus or rail-type vehicle, there is no requirement for the system operator to perform continuing maintenance, for example, interior cleaning, seat refitting, and interior refurnishing, to repair damage resulting from acts of vandalism. Maintenance of the satellite cars would be the responsibility of the car owner or leasee, and, since the car's passengers would be confined to their individual vehicle while being conveyed on the transporter, this would eliminate opportunities for damage to that equipment. This latter characteristic, confinement of the passengers to their satellite cars while in transit on the transporter vehicle, coupled with the fact that the cars are temporarily locked to the deck of the transporter, provides an important safety feature for the invention. In the event of an accident with the typical bus or rail-type transit vehicle, the passengers "float" about the interior of a large, open shell, subject to extensive injury. In the subject invention, on the other hand, the passengers are afforded the added protection of confinement to small structural shells — their individual satellite cars — fixedly contained within the larger, outer structural shell of the transporter vehicle. Of course, if an accident did occur, once the transporter came to rest, the satellite car passengers could readily make emergency exit through the doors of their cars and thence out the sides of the transporter vehicle.

Each control group of transporter or carrier vehicles may be under the direction of a remote radio control system so as to determine space and convenient spacing or intervals between adjacent controlled transport groupings or single transport vehicles. The satellite passenger vehicles or cars may also be individually self-propelled on surface streets or highways used in common with the transporters.

Therefore, it is a primary object of the present invention to provide a vehicular transportation system which includes a plurality of individual, self-propelled satellite vehicles, or cars, adapted to travel in a combined group on a transporter vehicle at a common, uniform speed along a main transit course or traffic artery wherein the transporter vehicle includes a loading mechanism for selecting a storage space on the transporter vehicle and for loading a selected satellite vehicle into said space.

Another obejct of the present invention is to provide a novel transporter vehicle for carrying a plurality of small vehicles, or cars, having means for loading and unloading the vehicles or cars to and from selected storage spaces located on the transporter.

Another object of the present invention is to provide a novel transporter vehicle for carrying a plurality of small cars which are normally self-propelled that includes loading means operable with respect to a plurality of in-line storage spaces for loading small cars into a preselected longitudinal storage space in the transporter's storage area.

Yet another object of the present invention is to provide a novel transportation system including a transporter vehicle for carrying a plurality of smaller vehicles wherein each of the smaller vehicles includes means for cooperating with the transporter for locking the smaller vehicles in place and for detachably connecting conditioned air ducts to the smaller vehicles.

Still another object of the present invention is to provide a novel satellite passenger vehicle, or car, which is self-propelled and adapted to be loaded onto a transporter vehicle wherein the satellite vehicle includes means for releasably securing the passenger vehicle to the transporter.

Another object resides in the provision of transfer means for conditioned air interconnecting the passenger vehicles or satellite cars with the transporter vehicle so that the environments of the satellite cars may be controlled to produce the maximum comfort for the passengers thereof while the cars are being conveyed by the transporter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

FIG. 1 is a side elevational view of the novel transporter and small passenger vehicle incorporating the present invention and illustrating the passenger vehicle in position to be loaded onto the transporter;

FIG. 2 is an enlarged transverse cross-sectional view of the transporter and the passenger vehicle shown in FIG. 1 as taken in the direction of arrows 2—2 thereof;

FIG. 3 is a cross-sectional view of a releasably locking pin for securing the vehicle to the transporter illustrating the pin in its retracted or non-locking position;

FIG. 4 is a view similar to the view shown in FIG. 3 illustrating the pin in its raised position interconnected with the vehicle;

FIG. 5 is a cross-sectional view of the locking pin as taken in the direction of arrows 5—5 of FIG. 4;

FIG. 6 is a longitudinal cross-sectional view of the transporter shown in FIG. 2 as taken in the direction of arrows 6—6 thereof;

FIG. 7 is a cross-sectional view taken in the direction of arrows 7—7 of FIG. 6 illustrating ramp actuating means for extending and retracting the loading ramp;

FIG. 8 is side elevational view of a portion of the means for extending and retracting the ramp;

FIG. 9 is a transverse cross-sectional view of the means shown in FIG. 8 as taken in the direction of arrows 9—9 thereof;

FIG. 14 is a side elevational view of an alternative configuration of the novel transporter vehicle wherein it has the form of a two-element, articulated vehicle with an increased capacity for the carriage of the small satellite cars;

FIG. 15 is a top plan view of the articulated carrier shown in FIG. 14.

DESCRIPTION OF THE PREFERRED EMBODIMENT

Figure 10:
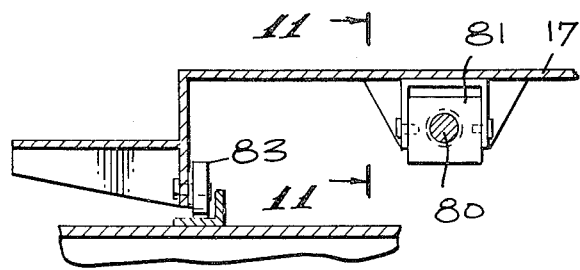
FIGS. 10 and 11 are fragmentary views of an alternate ramp actuation means.

The subject matter of the present invention relates to the co-pending applications referenced above, the substance of which is incorporated herein by such reference, and the present invention deals with components for the transportation system described therein which, by their design, novelty and interrelationship, enhance the flexibility of the basic system and greatly facilitate its implementation.

Referring now to FIG. 1, a transporter vehicle is indicated in the direction of arrow 10 which includes a cab 11 for housing the operating controls of the vehicle, and such components as the engine, drive train and the like. Immediately behind the cab 11, there is provided an elongated, enclosed body or compartment 12 constituting a storage area into which a plurality of small satellite passenger cars 13 may be housed. The storage area within enclosure 12 is divided into two parallel, longitudinally extending rows of storage spaces which extend the full length of the compartment. One of the storage rows is identified by numeral 15 in FIG. 2. It can be seen that one of the small passenger vehicles has already been loaded and is identified by numeral 16.

As illustrated in FIG. 1, the small satellite passenger vehicle 13 is being loaded into the enclosed body 12 of the transporter by a ramp means indicated by numeral 17. It is to be understood that a similar type of ramp means is provided at the forward end of the enclosed body as indicated in broken lines by the numeral 18. Both the forward and rear ends of the enclosed body are covered by doors such as indicated by numeral 20 which when raised provide ready access into and out of the enclosed transporter body. Preferably, the enclosed body is of a streamlined configuration and includes wheels 22 at its forward end and wheels 23 at the rear end. The vehicle carrier or transporter 10 is self-propelled and includes a suitable drive train extending between the propulsion unit and the wheels. Suitable controls including starting systems, throttle, and brakes are contained within the cab 11 and are operably connected to propulsion and driving means.

Referring now in detail to FIG. 2, it can be seen that the body 12 includes two longitudinal storage areas such as indicated on the right hand side by numeral 15. Each of the storage areas is defined by a deck 30 which extends between the opposite sides of the body. The deck is raised as indicated by numerals 31 and 32 to provide a pair of central portions intended to be located beneath a series or plurality of stored passenger vehicles. Each of the raised portions 31 and 32 are bordered by a desk tread such as indicated by numerals 33 and 34 which are intended to be rollably engaged with the wheels of the small passenger vehicle 16. Ramp 17 is illustrated directly beneath the deck so that its tire engaging rails 35 and 36 nest immediately below the deck tread surfaces such as 34 and 33 respectively.

Ramp means similar to ramp means 17 are associated with the deck extending on the other side of the body directly under the tread surfaces 33 and 34 associated with the raised deck portion 31.

A feature of the present invention resides in the provision of a locking means for releasably securing each of the small passenger vehicles to the transporter. One such means is briefly illustrated in FIG. 2 by numeral 40 associated with raised portion 31 of the deck and by numeral 41 associated with raised deck portion 32. This means incorporates a movable pin which may be remotely actuated so as to engage in a reciprocal provided in the underside of the passenger vehicle. Locking engagement is undertaken by expanding ears or locking elements that engage with suitable receptacles or mated slots in the receptacles. Details of the locking feature will be described later.

It is to be noted that the conditioned air duct 42, in general, includes an enclosed passageway in the roof of the vehicle body 12 which terminates in a fitting generally represented by numeral 43. The fitting 43 includes means for raising and lowering so that it will releasably engage with a collar 44 carried on the roof of the individual passenger vehicle 16. The collar 44 defines an opening leading into the interior of the vehicle and will be described in greater detail further in this specification.

Referring now in detail to FIG. 3, the locking means is illustrated in the general direction of arrow 45 and it can be seen that the means is mounted typically on the raised portion 32 of the deck. The locking means includes pin 41 that may be remotely raised or lowered by any suitable actuation means such as electrical means via control cables 46 and 47. The control cables may lead into a suitable motor within housing 48 which is suitably mounted on the underside of the deck raised portion 32. As shown in FIG. 3, the pin 41 is in its retracted position so as not to interfere with movement of the vehicle 16 thereover. However, as shown in FIG. 4, the pin 41 is in its raised position so that it's tapered end fits within a receptacle 50 formed in the bottom or underside of the passenger vehicle. When the pin 41 is raised into the receptacle 50, movement of the passenger vehicle is restricted. However, when the pin is retracted, sufficient clearance is provided between the top of the pin and the underside of the vehicle 16 to permit movement of the vehicle without interference of the pin.

As shown in FIG. 5, locking means are provided for securing pin 41 with the receptacle 50 of the vehicle 16. In one form, the locking means may take the configuration of pivoted ears or dogs 51 and 52 that may be remotely actuated so as to outwardly pivot into mating or corresponding slots within the receptacle 50 whereby a locking action is achieved. Actuation may be also simiply achieved by the tapered end of pin 41 engaging between the ears so as to outwardly pivot the ears 51 and 52 into engagement with the corresponding slots in the vehicle 16. Other locking means may be utilized and other actuation means may be employed which are considered within the scope of the present invention and concept.

It can be seen that the parallel, longitudinally extending parkways within the enclosed body 12 provides a housing for the ramp means. As illustrated in conformance with FIG. 1, ramp 17 is outwardly extended from the rear of the enclosed body 12 so as to accommodate the loading of car 13 thereon. The ramp includes a pair of parallel tread rails 60 and 61, FIG. 6, which are joined together by a plurality of fixed, spaced apart cross braces such as is indicated by numeral 62. It is to be understood that the ramp means 17 is stored beneath the deck 30 substantially under the raised portion 32 associated with one of the elongated storage areas. Another ramp means is also stored under the raised portion 31 associated with the storage area 15 and is illustrated in general by the numeral 63. For clarification, the raised area of the deck 32 has been broken away to expose the drive and supporting means for the ramp means thereunder. The drive and support means includes a pulley or sprocket drive 64 located at one end of an endless chain 65 while the opposite end of the endless chain is trained about a similar pulley or sprocket mechanism indicated by numeral 66. Such drives are conventional and it is to be understood that a remotely controlled motor and gear train are included within the housing 67 for selectively operating the drive sprocket 64 via their common shaft 68. Located on the chain drive 65, there is a carriage means 70 such as shown in FIG. 8 which includes a pivoted element 71 for supporting the end of the ramp means 17. This relationship is more clearly shown in solid lines in FIG. 7 wherein the end of the ramp 61 is carried on the element 71. As shown in FIG. 7 in solid lines, the element 71 is rotated about the ramp hinge pin pivotally connecting element 71 to element 70. As shown in broken lines, the element 71 is in its rearmost position when the ramp is stored. Guides are provided for the drive chain loop and are indicated by the numeral 72. It is to be understood that other drive means and actuation means for the ramp may be provided within the concept of the present invention.

Figure 11:
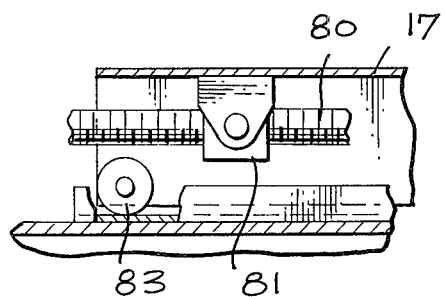

One such other means is shown in FIGS. 10 and 11 which constitutes an alternate ramp actuation means wherein the ramp is moved forward and rearward of the enclosed body 12 by means of the lead screw. The lead screw is indicated by numeral 80 and is secured to the underside of the ramp 17 by a threaded nut 81. The lead screw 80 is operably connected to the ramp so that its rotation is translated into driving movement for positioning the ramp. Rollers 83 rollably support the end of the ramp rails.

Figure 12:
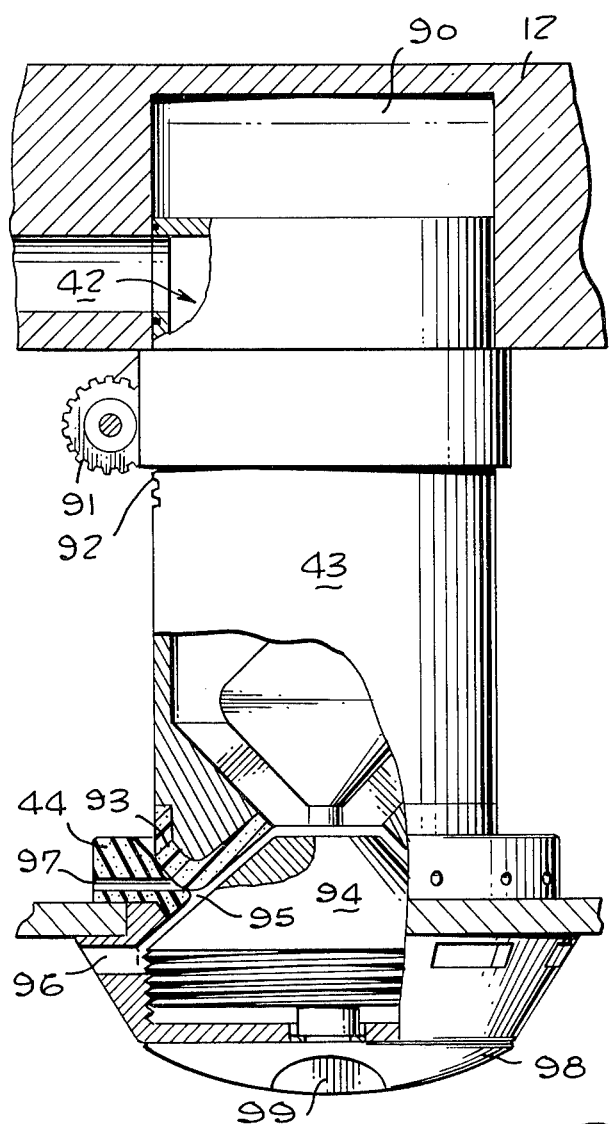
FIGS. 12 and 13 are an enlarged side elevational view of movable duct means for interconnecting the interior of a small passenger vehicle with an air conditioning system carried on the transporter.
Figure 13:
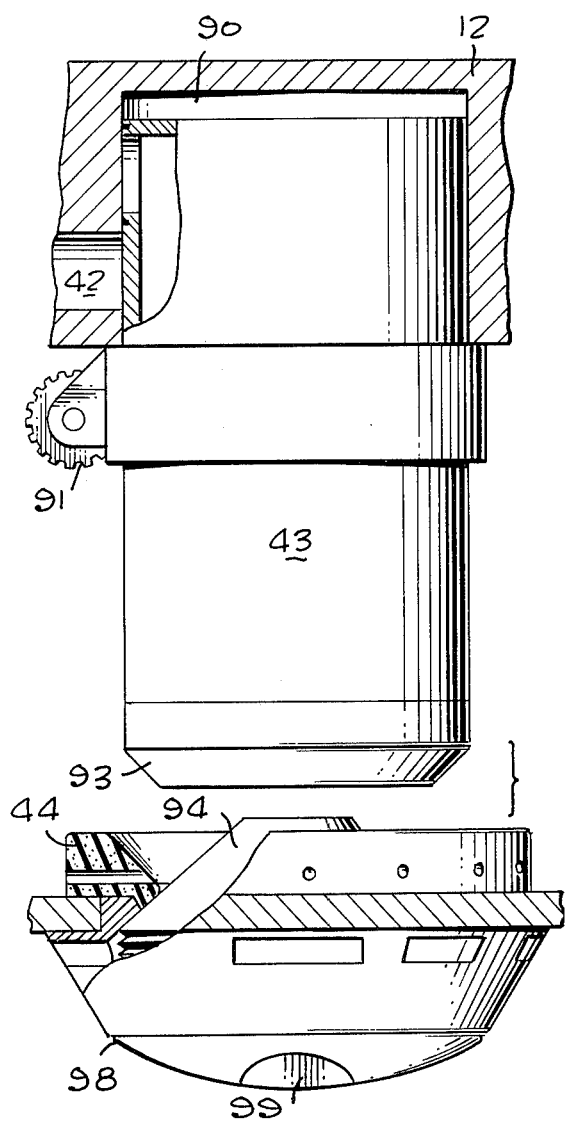

Referring now in detail to FIG. 12 and 13, the means for introducing conditioned air (cooled or heated) to the interior of the passenger vehicle is illustrated. It can be seen that the conditioned air duct 42 is incorporated into the roof of the enclosed body 12 and that the roof is provided with a cavity 90 adapted to accommodate extension and retraction of the movable duct 43. The interior of the duct 43 is in fluid communication with the passageway 42 as indicated by the arrow interconnecting the passageway with the interior of the duct when the movable duct 43 is in it's extended position as shown in FIG. 12. The movable duct 43 may be extended or retracted by pinion 91 which in turn engages with linear teeth 92 carried on the exterior surface of the moveable duct. When the duct is extended as shown in FIG. 12, its free end indicated by numeral 93 tapers in sealing engagement with collar 44 containing an opening leading into the interior of the passenger vehicle. The opening includes a closure member 94 that may be opened as shown in FIG. 12 to permit air flow to pass through an annular opening indicated by numeral 95 between the extreme tapered end of the movable duct 43 and the closure member 94. Air passing therebetween progresses into an internal outlet system communicating with a passageway 96 formed in the roof of the passenger vehicle. Control of closure 94 may be readily achieved from the interior of the passenger vehicle by finger recess 99 since it is a screw-type rotary valve. A water drain port is indicated by numeral 97 while air volume adjustment is indicated by the screw cap 98.

As shown in FIG. 13, the retractable or movable duct 43 is in its retracted position so that the wall of the duct closes off passageway 42. Also, the closure member or valve 94 has been actuated to close the passageway 95. The passenger vehicle is now separated from the conditioned air system and the opening defined by collar 44 has been closed so that the passenger vehicle may now be independently operated. It is to be understood that the pinion 91 may be actuated by any suitable remote control means as is adapted to the use desired.

Each of the satellite or passenger cars is locked into storage position by the individual car locking means. Each car includes a locking slot on its underside which accommodates the locking pin in the raised position to provide a positive stop as each satellite car is loaded on the carrier. For example, as each car leaves the loading ramp and contacts a trip plate on the carrier treadway, the appropriate locking pin is elevated to the stop position to engage the slot on the car allocated to that space. A cushioned bumper on the rear face of the locking pin (not shown) contacts the face of the slot to positively stop the car at its appropriate station. In this way, a minimum front and rear distance is possible between cars.

When the car reaches the positive stop (rear face of the vertical locking pin) it is in position for the insertion of the locking pin ears as in FIG. 5. The ears, when extended, restrain the car in a fore-and-aft position and also vertically lock it to the carrier deck. In addition, the ears in the extended configuration provide positive and negative contacts for the transmission of electrical power to recharge the satellite car batteries.

Therefore, functioning of the transportation system as disclosed herein involves the collection of the satellite or passenger cars in outlying, suburban areas, and their placement on the transporter vehicles. The transporter vehicles would convey the cars to the central city area where the cars would be unloaded and then proceed to their individual destinations under their own power. The return to the suburban areas would be accomplished in the same manner, with the cars collected in the central city, conveyed on the transporters to the suburbs, unloaded and then driven under their own power to individual destinations. The purpose of this system is to provide multi-mode, multi-function transportation, combining the advantages of mass-transit and personal-choice travel and making use of existing networks of streets, freeways, and highways as rights-of-way without interference with their originally intended function.

A feature of the invention resides in the fact that, in addition to its primary use as an urban/suburban transportation system, it may be employed to alleviate the ground access problem at major, metropolitan airports. In this application, the individual satellite cars could be rented at the airport by travelers. They would then be conveyed to the central city area in a controlled grouping on the transporter apparatus where they would be unloaded and released for the personal, local travel requirements of the renters. At the conclusion of this use of the satellite cars they, along with the renters as passengers, would be reloaded on the transporter apparatus and conveyed back to the airport in a controlled grouping. The advantage would lie in the consolidated movement of the rental satellite cars out of and into the airport environs on the transporter apparatus, as opposed to individual egress and entrance of numbers of rent-a-cars at the airport. Further advantages would lie in the fuel savings incident to the consolidated movement of the satellite cars over the characteristically great distances separating airports from the central city, and the lower cost of storage facilities for the satellite cars in proximity to the airport as contrasted with the cost of storage facilities in the central city area.

The fundamental advantage of the transportation system of the subject invention is its potential ability to greatly reduce the energy or work expended presently in performing the urban/suburban transportation function, thereby substantially reducing air pollution and the use of fuel for commuter travel. To better illustrate the possibilities for fuel savings and the conservation of energy it may be noted that some 50 million people commute to work each day in the United States, consuming several billion gallons of gasoline each year in the process. Nationwide implementation of the proposed transportation system would reduce this consumption of fuel by roughly 80%, thereby greatly easing what promises to be a continuing energy crisis. The subject invention consists of a new form of transporter vehicle equipped with its own, integral car loading/unloading device, and a new form of satellite car.

It will be noted that the transporter vehicle of FIG. 1 is a single-element or "straight" truck incorporating a single frame or chassis on which the running gear and the upper structure (driver's cab, car deck enclosure, etc.) are carried. Alternatively, as shown in FIGS. 14 and 15, the transporter apparatus or vehicle may be configured as a two-element, articulated vehicle indicated in general by numeral 100. The trailing carrier element 101 would be characterized by the same external envelope as the forward element 102 (which is essentially similar to the single-element or "straight" truck carrier), and would include an integral loading ramp 103 at the rear end, an air distribution system, and battery charging means for the satellite cars. A control cab would not be required on the trailing element and the main power plant for the carrier would be contained in the forward element. Since two additional satellite cars could be carried over an articulation coupling 104, a total of 30 satellite cars with 60 passengers could be moved in this type of two-element, articulated, transporter vehicle. With Ackermann-type (conventional) steering 105 of the two leading axles on the forward element, yaw-type 106 or articulated steering between the forward and trailing elements, and Ackermann steering of the two trailing element axles, the turning radius of the two-element carrier would be the same as that of the single-vehicle. Additionally, the two-element, articulated configuration carrier would comply with legal requirements for highway travel such as length, width, and height, and axle loadings.

The transporter vehicle may also take the form of a semi-trailer/tractor combination as described in the applicant's co-pending patent.

In the particular embodiment or configuration of the tranporter vehicle shown in FIG. 1, seven (7) satellite car stations or spaces are incorporated on each side of the deck of the transporter vehicle, for a total of fourteen (14); the numer of spaces obviously may be varied. A loading/unloading device is carried on each end of the transporter vehicle in the form of ramps. Referring now to one side, the ramp may be positioned longitudinally extensively in alignment with the car storage area. The ramp may be extended from the deck level of the transporter vehicle and lowered to, and raised from, ground level thereby enabling the satellite cars to be individually loaded into the longitudinally disposed storage areas from the ground or street level, and conversely, unloaded therefrom by a reverse procedure. The loading/unloading ramp means and mechanism causing its extended or retracted positioning is carried on guideway tracks longitudinally disposed along the length of the transporter vehicle; its longitudinal or fore and aft travel along the track means is caused by virtue of the attachment of its structure to a longitudinally disposed, endless chain driven by a motor incorporated on the frame of the transporter vehicle.

By incorporating an integral loading/unloading device on the transporter vehicle, the need for pernament collection/distribution station structures is eliminated, since the satellite cars may now be collected, in numbers or singly, at any convenient point and, conversely distributed at any point. Consequently, the transportation system has been made far more flexible and the need for capital investment is now limited entirely to the acquisition of rolling stock and requires no land to be purchased for collection/distribution stations nor funds expended for station construction.

In addition to accommodating the passenger-carrying satellite cars, the carrier or transporter is capable of transporting mail or parcel delivery vehicles with the same external envelope dimensions as the cars. Like the satellite cars, these vehicles would incorporate an energy storage means (batteries) and self-propulsion motor means.

In practice, the local delivery vehicle would be preloaded at a central facility in accordance with an established final distribution route. Deployment and return of the delivery vehicles to and from an outlying distribution point would be accomplished by the carrier or transporter in a fashion similar to the handling of the passenger-carrying satellite cars.

By way of illustration, the home delivery of newspapers is cited as an example. Satellite delivery vehicles would be loaded with the papers, most probably in a large, urban central business district in accordance with a final, suburban, local delivery route. Driverless, the satellite delivery vehicles would be moved over a main traffic artery to a designated pooint (station) in the outlying area. On reaching the station, individual drivers would take over control of the satellite delivery vehicles and complete the final delivery of the newspapers in the suburban community. Obviously, mail, parcels, and the like could be handled in the same manner.

Assuming an early morning suburban delivery, the deployed carrier or transporters, would then be ready to transport the passenger-carrying satellite cars for the return trip to the central business district. The late afternoon and evening functioning of the system would be the reverse of the foregoing.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A vehicular transportation apparatus for processing a passenger vehicle comprising: vehicles
   a plurality of individual self-propelled vehicles;
   a transporter vehicle having tired wheels and a storage compartment for storing a plurality of said individual vehciles including their occupants in a controlled grouping for combined transportation from one place to another along a roadway;
   said transporter vehicle having a deck for supporting said individual vehicles in longitudinal line one behind the other in two parallel rows;
   ramp means associated with the opposite ends of each storage row and operably carried by said deck to permit selective loading and unloading of said individual vehicles under their own propulsion onto and from said deck;
   locking mechanism carried by said individual vehicles and said deck for retaining said individual vehicles on said deck in said rows; and
   means cooperatively disposed between said individual vehicles and said transporter vehicle for providing conditioned air to the interior of each of said individual vehicles.

2. The invention as defined in claim 1
   wherein said transporter vehicle comprises a front and a rear section having adjacent opposing ends joined together by an articulating mechanism whereby said rear section pivots with respect to said front section.

3. The invention as defined in claim 2
   wherein said sections are supported on steerable wheels.

4. The invention as defined in claim 1
   wherein said locking mechanism includes matable pin and receptacle means cooperating when registered to releasably secure said individual vehicles in place on said deck of said transporter vehicle.

5. The invention as defined in claim 4
   wherein said pin and said receptacle means include cooperatively registering positive and negative electrical contacts enabling conduct of battery recharging electrical current from said transporter vehicle to said individual vehicles.

6. In a carrier apparatus for transportation of a plurality of passenger vehicles or the like comprising the combination of:
   a roadable vehicle including an elongated enclosed body having a cab disposed on the forward end thereof and a storage compartment disposed immediately behind said cab and extending to the aft end thereof;
   a deck disposed in said storage compartment for supporting stored passenger vehicles including the occupants thereof;
   loading and unloading means movably carried on said roadable vehicle body immediately beneath said deck and operable to selectively extend and retract from the opposite ends of said body;
   each of said passenger vehicles being self-propelled for independent operation separate from said roadable vehicle and adapted to be stored within said body via said loading and unloading means;
   conditioned air transmission means including conducting means intercoupling each of said passenger vehicles with said roadable vehicle body for delivering conditioned air to the interior of said passenger vehicle; and said conditioned air transmission means further including a conduct portion movably carried on the roof of said vehicle body and a stationary conduit fixed on the roof of said passenger vehicle in registry to sealingly receive said movable conduit portion in fluid conduit in fixed conducting relationship.

7. The invention as defined in claim 6 wherein said stationary conduit includes a screw-type movable plunger for opening and closing an annular opening formed in one end of said stationary conduit for controlling the volume of conditioned air flow into the interior of said passenger vehicle.

8. The invention as defined in claim 7 including interlock means cooperating between said conduit portion and said stationary conduct for releasably coupling said passenger vehicle to said roadable vehicle.

9. In a carrier apparatus for transportation of a plurality of passenger vehicles or the like comprising the combination of:
 a roadable vehicle including an elongated enclosed body having a cab disposed on the forward end thereof and a storage compartment disposed immediately behind said cab and extending to the aft end thereof;
 a deck disposed in said storage compartment for supporting stored passenger vehicles including the occupants thereof;
 loading and unloading means movably carried on said roadable vehicle body immediately beneath said deck and operable to selectively extend and retract from the opposite ends of said body;
 each of said passenger vehicles being self-propelled for independent operation separate from said roadable vehicle and adapted to be stored within said body via said loading and unloading means;
 locking means operably coupling each of said passenger vehicles to said roadable vehicle body for selectively securing said passenger vehicle in said storage compartment;
 said locking means includes a movable pin carried on said deck and a corresponding receptacle carried on said passenger vehicle; said pin and said receptacle being in registry and insertably connectable;
 said locking means further includes outwardly extending means carried on said pin releasably engageable with matable slots coextensive with said receptacle for releasably locking and retaining said passenger vehicle to said vehicle body deck; and
 said outwardly extending means carried on said pin of said deck of said roadable vehicle body are positive and negative electrical contacts mating with like contacts in said coextensive slots of said receptacle of said passenger vehicle enabling the conduct of battery recharging electrical current from aforesaid roadable vehicle to aforesaid passenger vehicle.

10. In a carried apparatus for transportation of a plurality of passenger vehicles or the like comprising the combination of:
 a roadable vehicle including an elongated enclosed enclosed body having a cab disposed on the forward end thereof and a storage compartment disposed immediately behind said cab and extending to the aft end thereof;
 a deck disposed in said storage compartment for supporting stored passenger vehicles including the occupants thereof;
 loading and unloading means movably carried on said roadable vehicle body immediately beneath said deck and operable to selectively extend and retract from the opposite ends of said body;
 each of said passenger vehicles being self-propelled for independent operation separate from said roadable vehicle and adapted to be stored within said body via said loading and unloading means;
 locking means operably coupling each of said passenger vehicles to said roadable vehicle body for selectively securing said passenger vehicle in said storage compartment; and
 conducting means intercoupling each of said passenger vehicles with said rodable vehicle body for delivering conditioned air to the interior of said passenger vehicle.

11. The invention as defined in claim 10 wherein said conducting means interconnects between the adjacent roofs of said vehicle body and said passenger vehicle and said locking means inteconnects between the underside of said passenger vehicle and said deck.

12. In a carrier apparatus for transportation of a plurality of passenger vehicles or the like comprising the combination of:
 a roadable vehicle including an elongated enclosed body having a cab disposed on the forward end thereof and a storage compartment disposed immediately behind said cab and extending to the aft end thereof;
 a deck disposed in said storage compartment for supporting stored passenger vehicles including the occupants thereof;
 loading and unloading means movably carried on said roadable vehicle body immediately beneath said deck and operable to selectively extend and retract from the opposite ends of said body;
 each of said passenger vehicles being self-propelled for independent operation separate from said roadable vehicle and adapted to be stored within said body via said loading and unloading means;
 locking means operably coupling each of said passenger vehicles to said roadable vehicle body for selectively securing said passenger vehicle in said storage compartment; and
 said loading and unloading means includes pairs of elongated rails constituting ramps retractable and extendable from opposite ends of said roadable vehicle; power means operably engaged with said rails for selectively moving either of said ramps.

13. The invention as defined in claim 12 wherein said storage compartment includes a pair of parallel, elongated storage areas so as to accommodate parallel rows of stored passenger vehicles and loading and unloading ramps extendably carried at the opposite ends of each of said storage areas.

* * * * *